(12) United States Patent
Terada

(10) Patent No.: US 7,872,819 B2
(45) Date of Patent: Jan. 18, 2011

(54) LENS BARREL AND IMAGING APPARATUS

(75) Inventor: Shuichi Terada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 12/508,415

(22) Filed: Jul. 23, 2009

(65) Prior Publication Data

US 2010/0027139 A1 Feb. 4, 2010

(30) Foreign Application Priority Data

Aug. 1, 2008 (JP) .............................. 2008-200044

(51) Int. Cl.
*G02B 7/02* (2006.01)
(52) U.S. Cl. .................... 359/819; 359/821; 359/822
(58) Field of Classification Search ............... 359/819, 359/821, 822, 823, 824, 825, 826
See application file for complete search history.

(56) References Cited

U.S. PATENT DOCUMENTS

2006/0181783 A1* 8/2006 Masuki ...................... 359/700

FOREIGN PATENT DOCUMENTS

| JP | 05-333255 A | 12/1993 |
| JP | 2008-058581 A | 3/2008 |

* cited by examiner

*Primary Examiner*—Timothy J Thompson
(74) *Attorney, Agent, or Firm*—Canon U.S.A., Inc. I.P. Division

(57) ABSTRACT

When an external force that is equal to or greater than the urging force of a first ball spring is applied to a first lens holder, a first ball follower is dislocated from a first cam groove, and a first external force receiving groove and a first external force receiving pin are brought into engagement to receive the external force. When the external force that has been applied to the first lens holder is released, the first ball follower is restored to the first cam groove due to the urging force of the first ball spring.

10 Claims, 16 Drawing Sheets

LENS BARREL AND IMAGING APPARATUS

BACKGROUND OF THE INVENTION

1. Field of the Invention

The present invention relates to a lens barrel that is mounted in an optical device for a camera or the like, and an imaging apparatus that includes the lens barrel.

2. Description of the Related Art

Conventionally, in a lens barrel that is used in a digital camera and the like, a mechanism that moves the lens in the direction of the optical axis is formed by a cam cylinder provided with a cam groove and a lens holder that includes a lens and cam pin, as disclosed, for example, in Japanese Patent Laid-Open No. 2008-58581. In this conventional lens barrel, when the cam cylinder rotates, the cam pin, which engaged with the cam groove on the inner circumferential side of the cam cylinder, is guided by a rectilinear key along the lift of the cam groove to move in the direction of the optical axis. Thereby, the lens holder moves in the direction of the optical axis. In addition, as can be seen in Japanese Patent Laid-Open No. 05-333255, engaging a ball in a cam grove instead of a cam pin in a mechanism that moves the lens in the direction of the optical axis has been disclosed.

However, in the lens barrel that uses a cam pin as disclosed in Japanese Patent Laid-Open No. 2008-58581, there is a case that the drive load on the lens barrel easily becomes heavy due to line contact friction between the cam pin and the cam groove when the lens is driven.

When the drive load of the lens barrel is heavy, the deceleration ratio of the deceleration gear train that transfers drive force between the motor that drives the lens barrel and the lens barrel is increased, and thus, the drive torque must be raised. In such a case, when driven by the same motor speed as the case in which the drive load of the lens barrel is light, there is a case in that the drive time for the lens barrel increases. In contrast, when a motor speed is set higher than the case in which the drive load of the lens barrel is light in order to make the drive time of the lens barrel identical to the case in which the drive load of the lens barrel is light, there is a case in that the drive noise of the lens barrel becomes loud.

In addition, in order to decrease the drive load of the lens barrel that is generated by manufacturing error, a play equivalent to the component manufacturing error may be provided in advance at the engaging portions between the cam pin and the cam groove. However, in such a case, there is a case in that the precision with which the lenses are held deteriorates. Furthermore, in a lens barrel that uses a ball as a follower instead of a cam pin, there is a concern that the ball follower may be dislocated from the cam groove due to an external force. Thus, there is a case in that, as disclosed in Japanese Patent Laid-Open No. 05-333255, locations at which a ball follower can be used become limited to portions where they are not subject to external force.

SUMMARY OF THE INVENTION

The present invention provides a lens barrel and a photographic apparatus that, in the case in which a rotating body such as a ball is used as a follower instead of a cam pin, by increasing the strength against an external force that is acting thereon to reduce the drive load of the lens barrel, enables to realize at least one among the reducing noise and the increasing the drive speed. In addition, the present invention realizes the improvement of the lens holding precision of such a lens barrel and photographic apparatus.

The lens barrel according to a first aspect of the present invention includes a first cylinder member that has at least a portion formed in a cylindrical shape, and a second cylinder member that has at least a portion formed in a cylindrical shape and that fits over the first cylinder member. A first engaging portion is provided on the first cylinder member. The first engaging portion is provided on a side opposed to the second cylinder member. A second engaging portion is provided on the second cylinder member. The second engaging portion is formed in a spherical shape. The first cylinder member and the second cylinder member can rotate relatively around the center line of the cylindrical shapes due to the engagement of the first engaging portion and the second engaging portion. The first cylinder member and the second cylinder member each have an auxiliary engaging portion that engages when an external force is acting in a direction along the center line of the cylindrical shapes.

The imaging apparatus of a second aspect of the present invention includes the lens barrel of the first aspect of the present invention, and an imaging portion that captures a subject image that is formed by the lens barrel.

Further features and aspects of the present invention will become apparent from the following description of exemplary embodiments with reference to the attached drawings.

DESCRIPTION OF THE EMBODIMENTS

Below, various embodiments for implementing the present invention are explained with reference to the figures. Note that each figure shown below is shown schematically, and the size and shape of each part are shown appropriately emphasized in order to facilitate understanding. In addition, although the following explanations are provided with specific numerical values, shapes, and materials and the like, these may be appropriately modified. Furthermore, in the following explanations, terms that express directions such as above and below, left and right, and front and back and the like are, unless otherwise specified, based on the camera being in a frontal position. "Above" and "below" denote above and below when the camera is positioned frontally, "left" and "right" denote directions defined such that the right hand side is on the right when a photographer that is holding the camera views the camera from the back side thereof, and "front" and "back" denote directions defined such that the subject side is in front of the camera. Here, the frontal position denotes a position in which the photographer holds the camera in a normal position, that is, a position when the camera is held while the optical axis of the imaging optical system is horizontal and the longitudinal direction of the image-capture screen is a horizontal direction.

Figure 1:
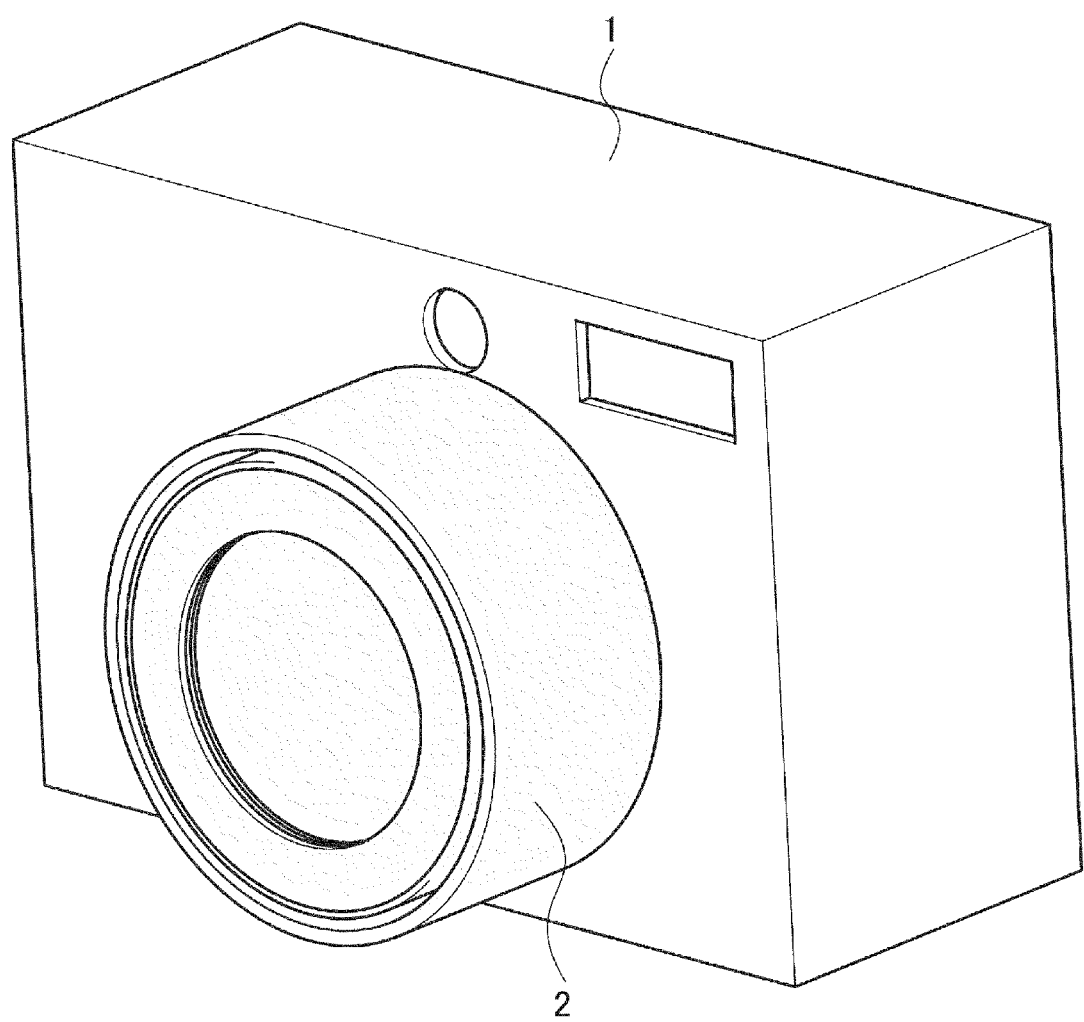
FIG. 1 is a perspective view that shows an embodiment of a camera 1 having a lens barrel 2 according to the present invention.

FIG. 1 is a perspective view that shows an embodiment of the camera 1 having the lens barrel 2 according to the present invention. The camera 1 of the present embodiment is a digital camera that includes a retractable lens barrel 2 at the front. Note that the camera 1 is generally used for still photography, but can also be one that carries out video photography.

Figure 2:
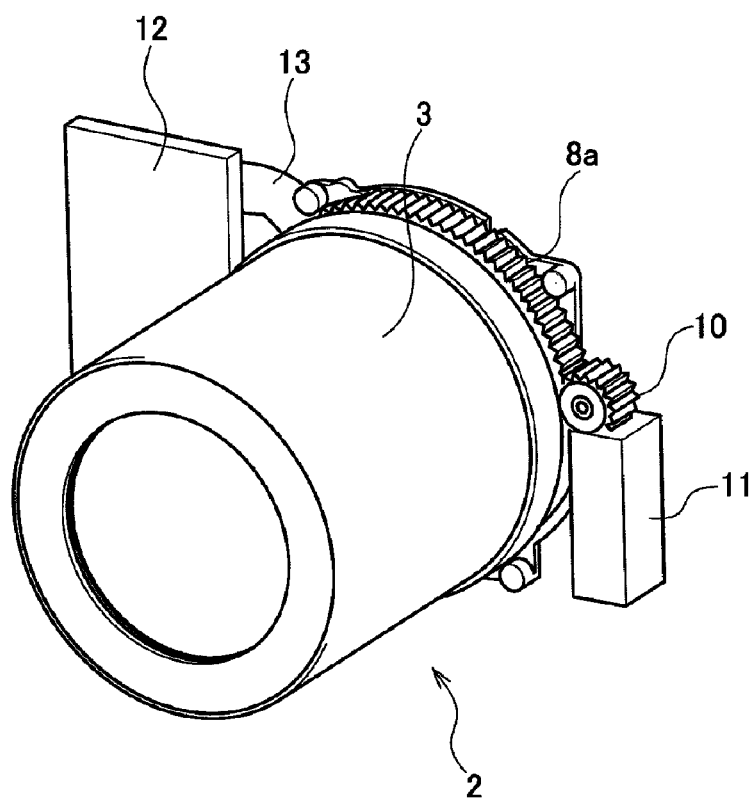
FIG. 2 is a perspective drawing that shows the lens barrel 2 and the portions related thereto.

FIG. 2 is a perspective view that shows the lens barrel 2 and the parts related thereto. The lens barrel 2 includes the cam cylinder 8, which will be described below, on the outermost periphery, and includes a gear portion 8a on the outer peripheral portion of the back end portion thereof. A drive gear 10 meshes with this gear portion 8a at the left side of the lens barrel 2, and a drive force from the zoom drive apparatus 11 is transferred to the gear portion 8a from the drive gear 10. A main printed circuit board 12 is disposed at the right side of the lens barrel 2, and the lens barrel 2 and the main printed circuit board 12 are electrically connected via the lens barrel flexible printed substrate 13.

Figure 3:
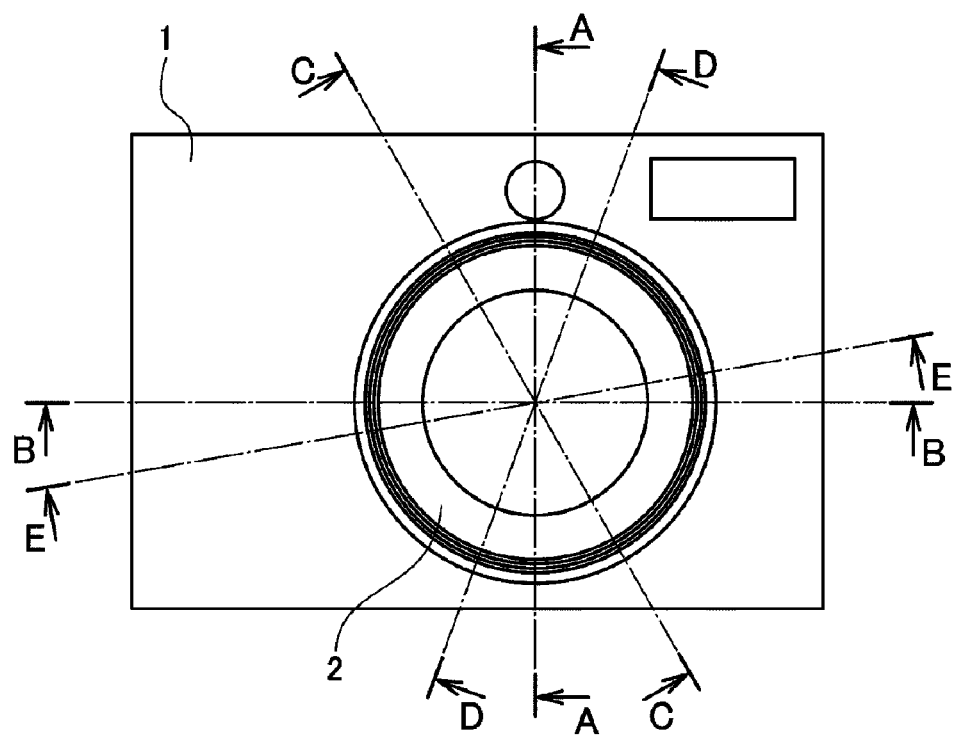
FIG. 3 is a frontal view of the camera.
Figure 4:
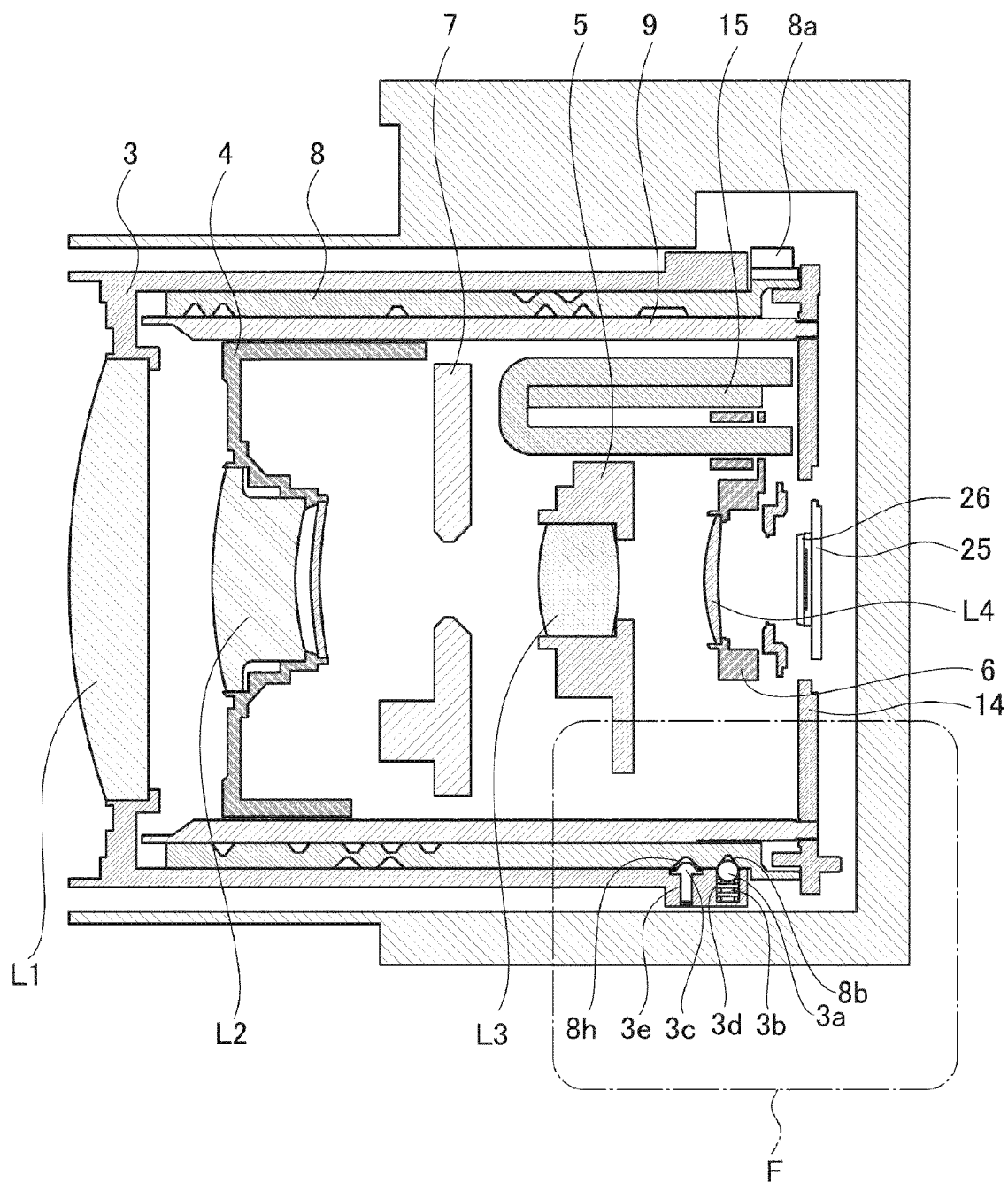
FIG. 4 is a cross-sectional drawing along line A-A in FIG. 3 in a retracted state.
Figure 5:
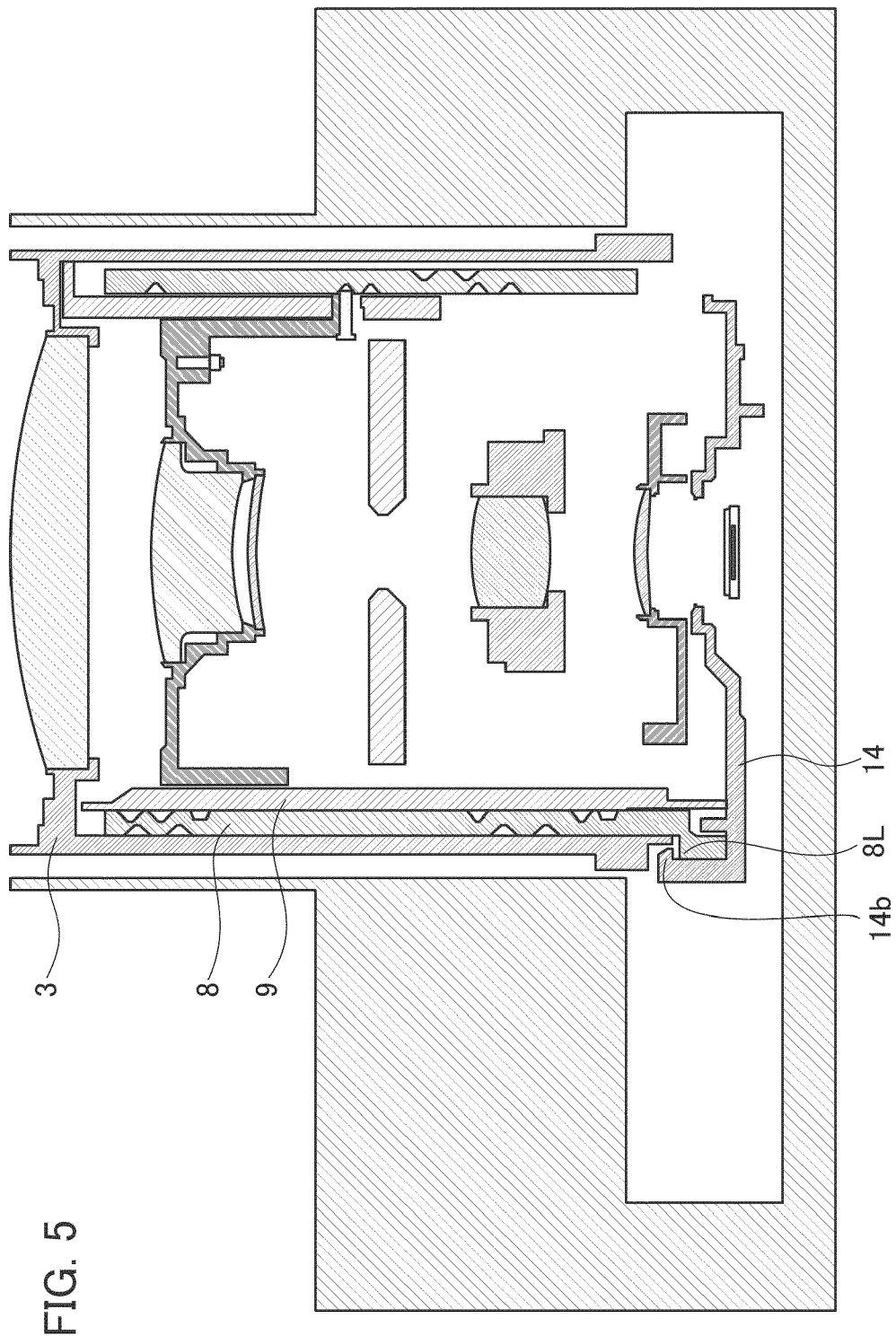
FIG. 5 is a cross-sectional drawing along line B-B in FIG. 3 in a retracted state.
Figure 6:
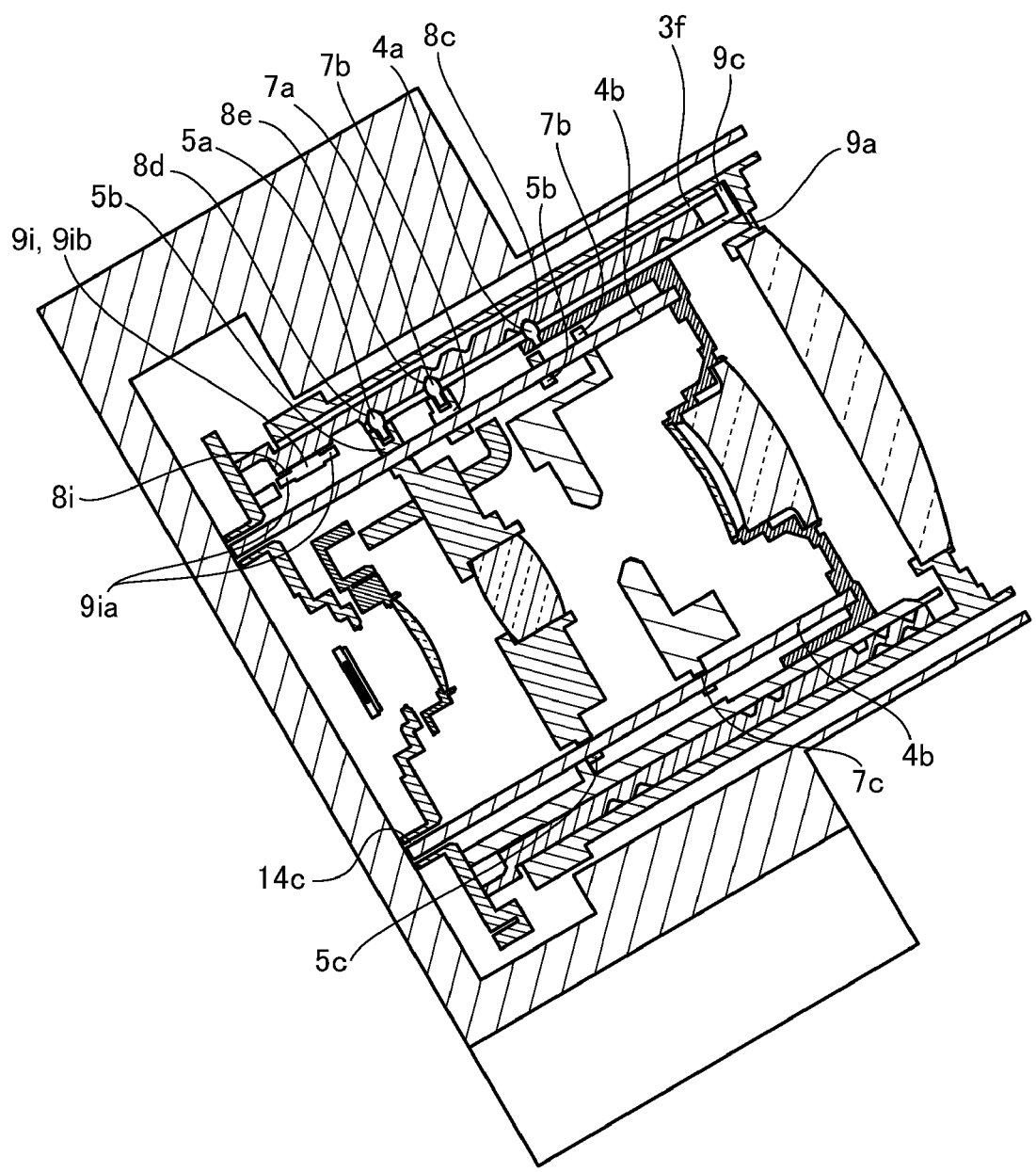
FIG. 6 is a cross-sectional drawing along line C-C in FIG. 3 in a retracted state.
Figure 7:
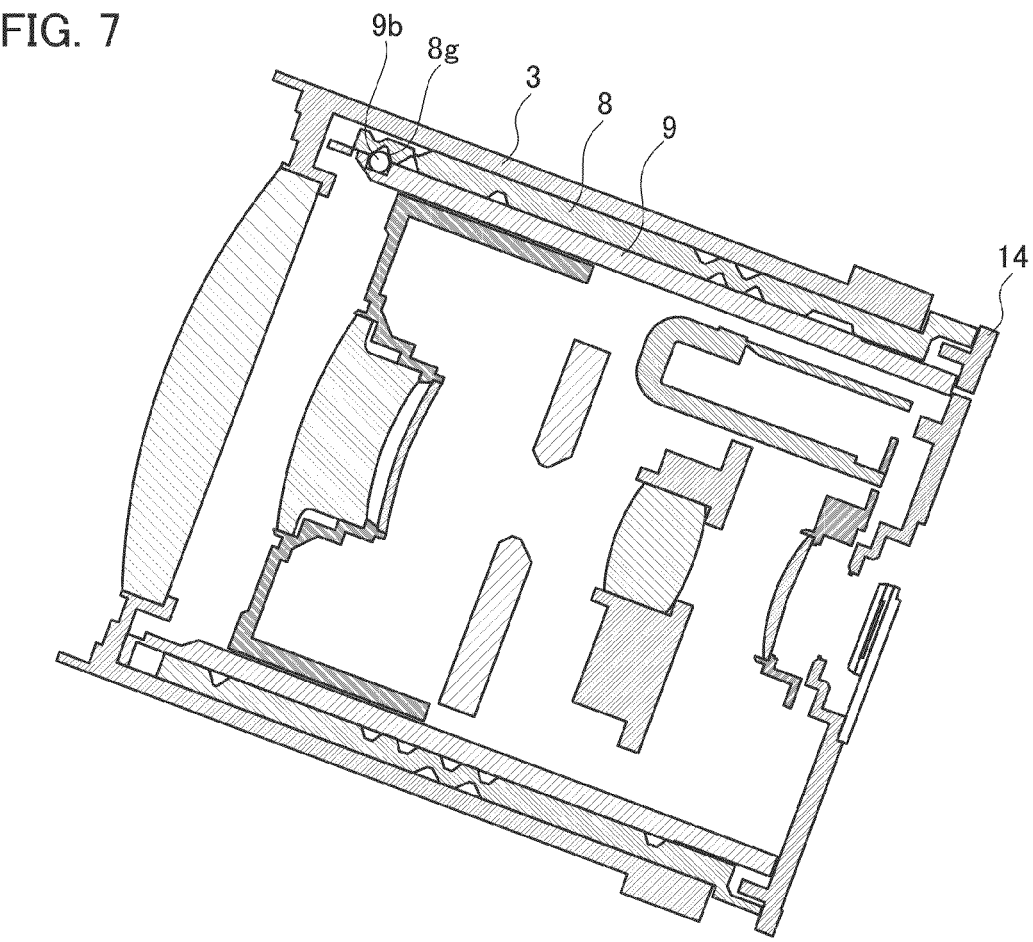
FIG. 7 is a cross-sectional drawing along line D-D in FIG. 3 in a retracted state.

FIG. 3 is a frontal view of the camera. FIG. 3 shows the cross-sectional position and direction of the cross-sections in the subsequent figures. FIG. 4 is a cross-sectional view along line A-A in FIG. 3 in a retracted state. FIG. 5 is a cross-sectional view along line B-B in FIG. 3 in the retracted state. FIG. 6 is a cross-sectional view along line C-C in FIG. 3 in the retracted state. FIG. 7 is a cross-sectional view along line D-D in FIG. 3 in the retracted state. Note that in each of the cross-sectional views shown below, including FIG. 4 to FIG. 7, except for one portion, only a cross-section is shown. The lens barrel 2 includes first lens L1, second lens L2, third lens L3, and fourth lens L4, which form the imaging optical system, and the focal point adjustment is carried out by moving the fourth lens L4 in the optical axis direction. In addition, the lens barrel 2 includes first lens holder 3, second lens holder 4, third lens holder 5, fourth lens holder 6, a shutter unit 7, a cam cylinder 8, a fixed cylinder 9, a CCD holder 14, and a fourth drive apparatus 15. Furthermore, a CCD plate 25 and a CCD 26 are provided at the back end of the lens barrel 2.

The portion of the first lens holder 3 that holds the first lens L1 is formed in a cylindrical shape, and functions as a second cylinder member by being disposed so as to fit over the outer peripheral side of the cam cylinder 8 that serves as a first cylinder member. In the present embodiment, a portion of all of the first lens holder 3, the second lens holder 4, the cam cylinder 8, and the fixed cylinder 9 has a cylindrical shape, and the center line of these cylindrical shapes and the optical axes of the imaging optical systems are disposed so as to be coextensive. The first lens holder 3 includes a first ball follower 3a, a first ball spring 3b, a first external force receiving pin 3c, a ball hole 3d, a pin hole 3e, and a first rectilinear groove 3f.

Figure 8:
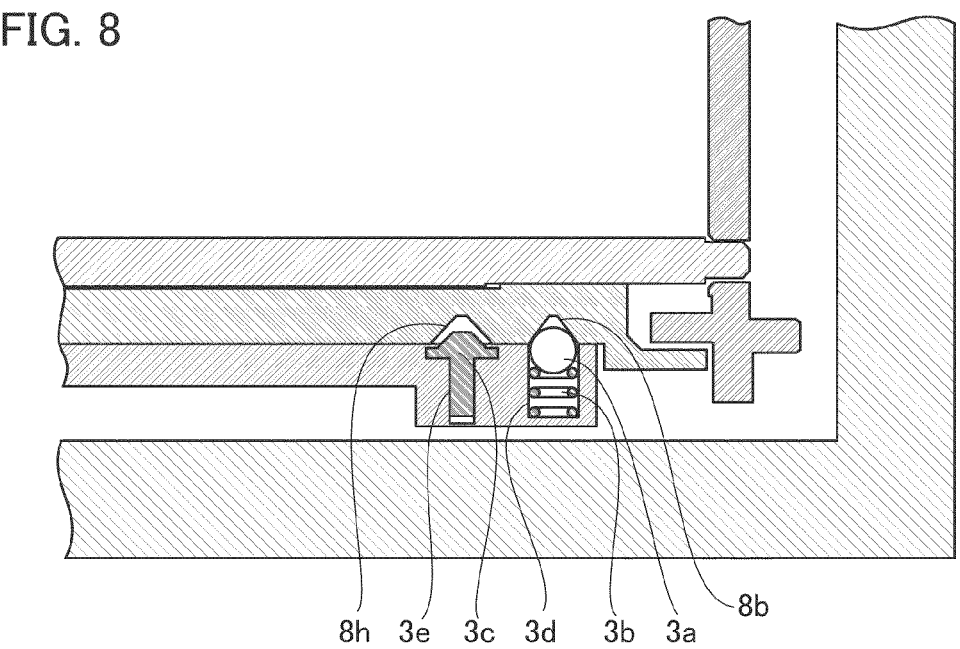
FIG. 8 is a drawing in which the portion F in FIG. 4 has been enlarged.

FIG. 8 is a drawing in which the portion F in FIG. 4 has been enlarged. The first ball follower 3a is formed in a spherical shape by, for example, stainless steel, fits into the ball hole 3d, and functions as a follower that tracks a first cam groove 8b, which has a cam shape, while rolling. The ball hole 3d opens in a direction that is perpendicular to the optical axis (which is coextensive with the center line of the cylindrical shape of the first lens holder 3 itself), and the external peripheral side thereof is a closed hole portion. The first ball follower 3a fits in the ball hole 3d, and thus, the direction of possible movement is restricted by this ball hole 3d, and the first ball follower 3a can only move with respect to the first lens holder 3 in a direction that is perpendicular to the optical axis. The first ball spring 3b is a compressed coil spring that is inserted into the ball hole 3d, and functions as an urging unit that urges the first ball follower 3a toward the optical axis. The first ball follower 3a thereby abuts the first cam groove 8b. In addition, when the engagement between the first ball follower 3a and the first cam groove 8b has been partially dislocated, the first ball spring 3b functions as a restoring unit that restores the first ball follower 3a and the first cam groove 8b to their engaged state. Due to being structured in this manner, the first ball follower 3a functions as a second engaging portion that is engaged with the first cam groove 8b (to be described below), which serves as a first engaging portion.

The first external force receiving pin 3c includes a columnar portion, a flange shaped portion that is provided closer the optical axis side than this columnar portion, and a conical portion that is provided even closer to the optical axis side than the flange shaped portion. The cylindrical portion of the first external force receiving pin 3c fits into the pin hole 3e. The pin hole 3e passes though in a direction perpendicular to the optical axis. In addition, the conical portion of the first external force receiving pin 3c is inserted into the first external force receiving groove 8h. However, a small space is maintained so that the first external force receiving pin 3c and the first external force receiving groove 8h do not abut. Due to such a structure, the first external force receiving pin 3c functions as a second auxiliary engaging portion that is engaged with the first external force receiving groove 8h (to be explained below), which serves as a first auxiliary engaging portion, and an auxiliary engaging portion is formed thereby. The first ball follower 3a, the first ball spring 3b, the first external force receiving pin 3c, the ball hole 3d, and the pin hole 3e described above are all disposed at three locations so as to be separated from each other by equal intervals in the peripheral direction centered on the optical axis.

Returning to FIG. 4 to FIG. 7, the first rectilinear groove 3f has a groove shape that is formed on the inner peripheral side of the first lens holder 3 so as to be parallel to the optical axis, and fits over first rectilinear key 9c so as to be movable in a direction along the optical axis.

The second lens holder 4 is a substantially cylindrically shaped member that holds the second lens L2, and is disposed at the inner peripheral side of the fixed cylinder 9. The second lens holder 4 includes the second cam pin 4a and the pair of second bars 4b. The second cam pin 4a is provided to as to project toward the outer peripheral side of the second lens holder 4 and be brought in to engagement with the second cam groove 8c at the inner peripheral side of the cam cylinder 8. Two second bars 4b are both parallel to the optical axis and are disposed so as to extend from the second lens holder 4 rearward on the optical axis. In a retracted state, the back end portion of the second bars 4b are inserted into the hole portions 14c of the CCD holder 14.

The third lens holder 5 includes a third cam pin 5a, third sleeves 5b, and a third brace 5c, and holds the third lens L3. The third cam pin 5a projects toward the outer peripheral side of the third lens holder 5 and is engaged with the third cam groove 8d at the inner peripheral side of the cam cylinder 8. The third sleeves 5b are provided at two locations separated by an interval in a direction along the optical axis, and each one movably engages one among the pair of second bars 4b (hereinbelow, referred to as the "primary second bar 4b"). The third brace 5c movably engages a second bar 4b (hereinbelow, referred to as the "secondary second bar 4b") other than the first second bar 4b among the pair of second bars 4b. The fourth lens holder 6 holds the fourth lens L4 and is driven by the fourth drive apparatus 15.

The shutter unit 7 is disposed in the direction of the optical axis at a position between the second lens holder 4 and the third lens holder 5, and includes a shutter cam pin 7a, shutter sleeves 7b, and a shutter brace 7c. The shutter unit 7 is provided with a shutter that blocks and passes imaging light flux and a diaphragm that limits the amount of the imaging light flux that that passes therethrough. Note that a configuration may be used in which the shutter 7 also acts as a diaphragm by changing the aperture diameter of the shutter. The shutter cam pin 7a is provided so as to project on the outer peripheral side of the shutter unit 7 and is brought into engagement the shutter cam groove 8e on the inner peripheral side of the cam cylinder 8. The shutter sleeves 7b are provided at two locations such that a gap is maintained therebetween in the direction along the optical axis, and both movably engage the first second bars 4b. The shutter brace 7c is fit so as to be movable along the secondary second bar 4b.

Figure 9:
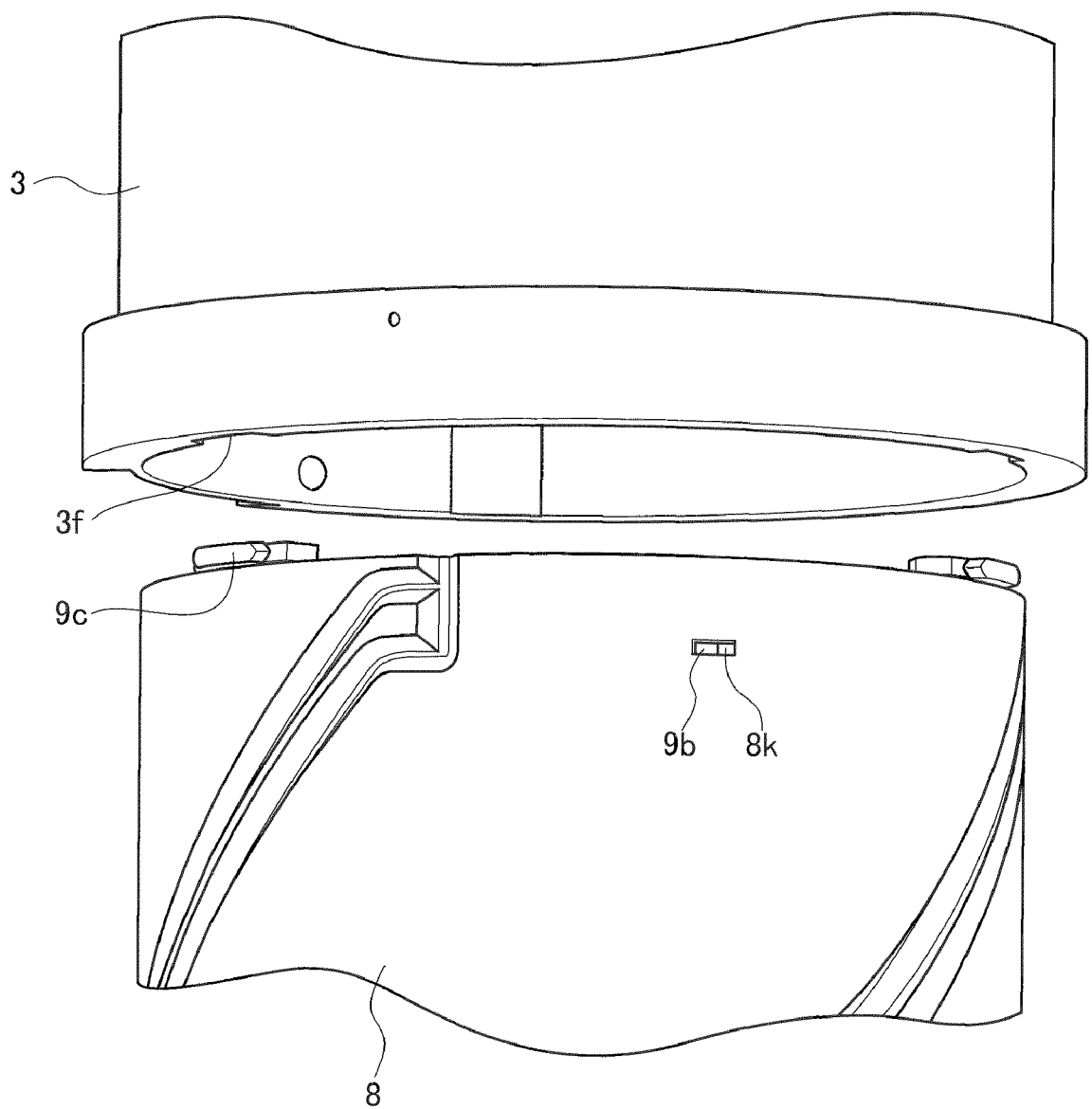
FIG. 9 is a drawing that shows the vicinity of the front end of the cam cylinder 8 and the vicinity of the back end of the first lens holder.
Figure 17:
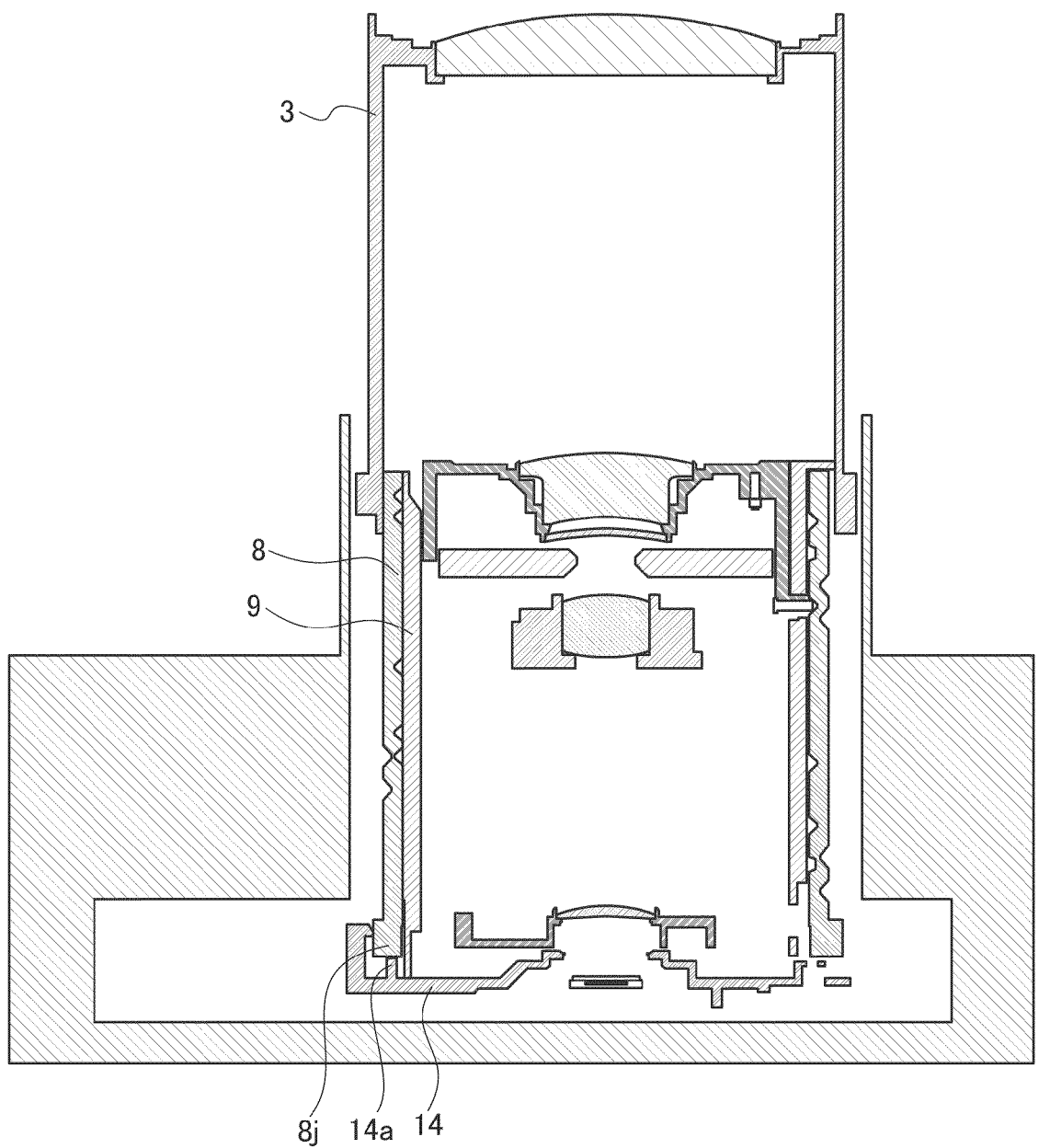
FIG. 17 is a cross-sectional drawing along line B-B in FIG. 3 in a telephoto state.

The cam cylinder 8 is a first cylinder member that is disposed on the inner peripheral side of the first lens holder 3 and on the outer peripheral side of the fixed cylinder 9. The cam cylinder 8 rotates centered on the optical axis, and a gear portion 8a, a first cam groove 8b, a first external force receiving groove 8h, and a cam cylinder separation preventing stopper 8L are provided on the outer peripheral side, and a second cam groove 8c, a third cam groove 8c, a shutter cam groove 8e, a cam cylinder drive cam grove 8g, and a roller guide 8i are provided on the inner peripheral side. The first cam groove 8b functions as a first engaging portion, in which the cross-section of the groove shape thereof defines two inclined surfaces and a bottom. The first cam groove 8b forms a cam shape by forming a spiral shape on the outer periphery of the cam cylinder 8 on a side opposed to the first lens holder 3. The first external force receiving groove 8h has a groove shape having a locus along which the cam locus of the first cam groove 8b moves horizontally along the optical axis, and functions as a first auxiliary engaging portion. The first cam groove 8b and the first external force receiving groove 8h are both separated from each other in a peripheral direction centered on the optical axis and disposed so as define a spiral at three locations separated by an equal distance. In addition, as shown in FIG. 17, which will be explained later, a cam cylinder external force receiving portion 8j is formed at the end surface of the cam cylinder 8 on the CCD holder 14 side. FIG. 9 is a drawing that shows the vicinity of the front end of the cam cylinder 8 and the vicinity of the back end of the first lens holder 3. As shown in FIG. 9, a fixed cylinder ball follower window 8k is formed at the bottom surface of the groove portion of the cam cylinder driving cam groove 8g.

As shown in FIG. 8, the first ball follower 3a abuts the first cam groove 8b due to the urging force of the first ball spring 3b. In addition, in the state shown in FIG. 8, in which the first ball follower 3a abuts the first cam groove 8b, the first external force receiving pin 3c is disposed in the first external force receiving grove 8h while maintaining a suitable gap. Due to the engagement of this first cam groove 8b and the first ball follower 3a, the first lens holder 3 and the cam cylinder 8 are relatively rotatable centered on the optical axis.

Figure 10:
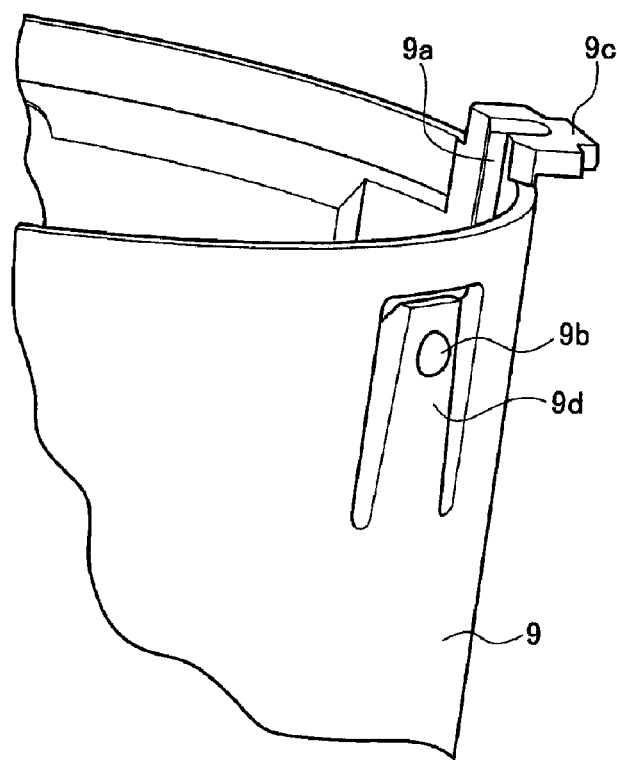
FIG. 10 is a drawing that shows the vicinity of the front end of the fixed cylinder 9.

Returning to FIG. 4 to FIG. 7, the fixed cylinder 9 is disposed at the inner peripheral side of the cam cylinder 8 and at the outer peripheral side of the second lens holder 4. FIG. 10 is a drawing that shows the vicinity of the front end of the fixed cylinder 9. Through-hole shaped second rectilinear grooves 9a, which extend in the direction of the optical axis, are all disposed at three locations separated from each other by equal distances on the outer peripheral side of the fixed cylinder 9 in the peripheral direction centered on the optical axis. In addition, the first rectilinear key 9c is formed at the upper end surface of the fixed cylinder 9 that has the same phase as the second rectilinear groove 9a. The second cam pin 4a is brought into moveable engagement with the second rectilinear groove 9a in the direction of the optical axis. The first rectilinear groove 3f is brought into movable engagement with the first rectilinear key 9c in the direction of the optical axis.

In addition, the fixed cylinder ball followers 9b are all movably disposed on the outer periphery of the fixed cylinder 9 at three locations separated from each other in the peripheral direction centered on the optical axis. At least one among the fixed cylinder ball followers 9b is urged into the cam cylinder drive cam groove 8g of the cam cylinder 8 by the fixed cylinder ball spring portion 9d, and due to the reactive force, the other two fixed cylinder ball followers 9b are forced into the cam cylinder drive cam groove 8b. In addition, a roller 9i is disposed in the vicinity of the back end of the fixed cylinder 9 such that the rotational center thereof is parallel to the optical axis. The roller 9i is formed by an elastic material such as polyacetal, and is further formed by a pair of upper and lower shaft portions 9ia and a drum portion 9ib that is thicker than the shaft portions 9ia. The roller 9i is supported by the fixed cylinder 9 such that the shaft portion 9ia can rotate, and the drum portion 9ib abuts the roller guide 8i of the cam cylinder 8 to rotatably support the cam cylinder 8 at the outer periphery of the fixed cylinder 8.

Figure 11:
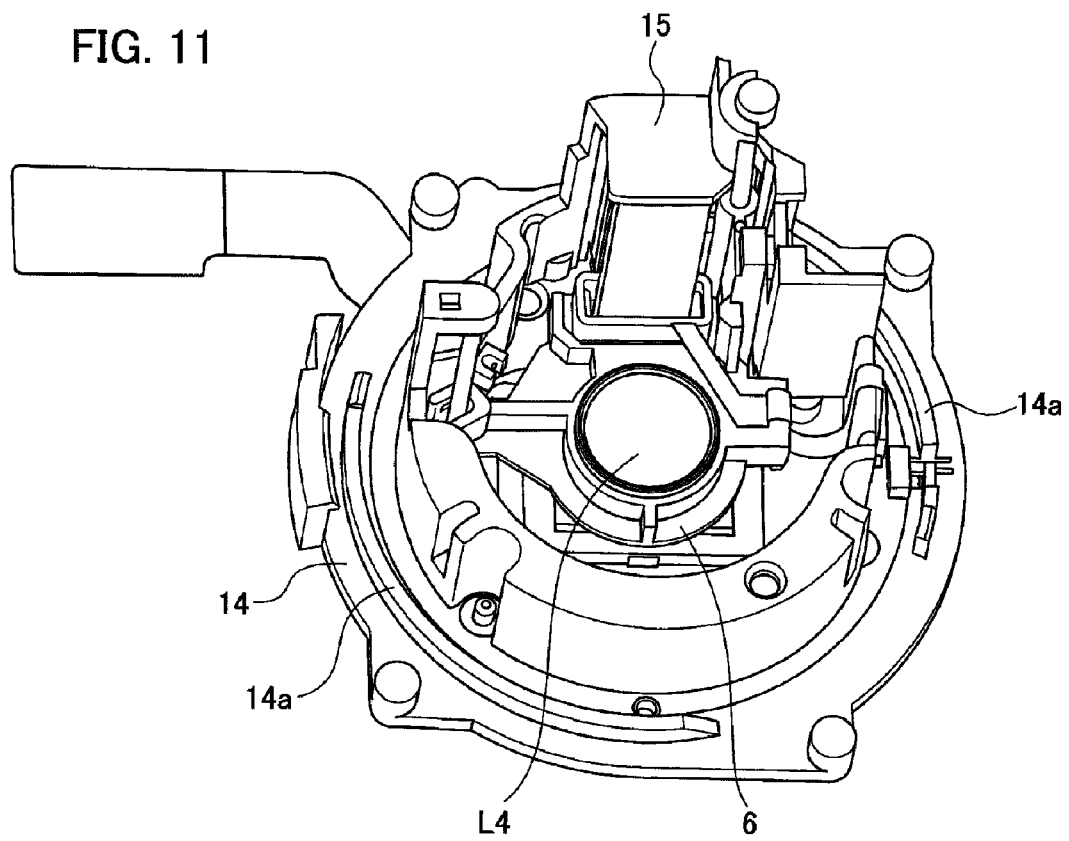
FIG. 11 is a drawing that shows the CCD holder 14 and the members in the vicinity thereof.

FIG. 11 is a drawing that shows the CCD holder 14 and the members in the vicinity thereof. The CCD holder 14 is disposed so as to close the back end of the lens barrel 2, and includes a CCD holder external force receiving portion 14a, a CCD holder stopper 14b, and the hole portion 14c. In addition, the CCD holder 14 holds the fixed cylinder 9, the drive gear 10, the zoom drive apparatus 11, and the fourth drive apparatus 15, and is fastened to the camera 1.

The fourth drive apparatus 15 is formed by any known available voice coil, and drives the fourth lens holder 6. The fourth drive apparatus 15 drives the fourth lens holder 6, and thereby the fourth lens L4 is moved in a direction along the optical axis along with the fourth lens holder 6 to carry out focal point adjustment.

Returning to FIG. 4 to FIG. 7, a CCD plate 25 holds the CCD 26 and is fastened by the CCD holder 14. A CCD (Charge Coupled Device) 26 is an imaging portion that photoelectrically converts a subject image that has been formed by the lens barrel 2. Note that other types of imaging elements such as a CMOS (Complementary Metal Oxide Semiconductor) image sensors may be used as the imaging element employed in the imaging portion. The CCD 26 is connected to a main printed circuit board 12 via wiring (not illustrated).

Next, the operation of the lens barrel 2 will be explained. When a zoom drive apparatus 11 is electrically charged from the main printed circuit board 12 via the lens barrel flexible printed substrate 13, the cam cylinder 8 rotates around the fixed cylinder 9 due to the drive gear 10 that is linked to the gear portion 8a of the cam cylinder 8. When the cam cylinder 8 rotates, the first ball follower 3a, which engages the first cam groove 8b on the inner peripheral side of the cam cylinder 8, is guided by the first rectilinear key 9c that fits into the first rectilinear groove 3f along the lift of the first cam groove 8b to move in the direction of the optical axis. In the same manner, when the cam cylinder 8 rotates, the second cam pin 4a, which is engaged with the second cam groove 8c on the inner peripheral side of the cam cylinder 8, is guided by the second rectilinear groove 9a along the lift of the second cam groove 8c to move in the direction of the optical axis.

Similarly, when the cam cylinder 8 rotates, the third cam pin 5a, which is engaged with the third cam groove 8d on the inner peripheral side of the cam cylinder 8, is guided by the second bar 4b along the life of the third cam groove 8d to move in the direction of the optical axis. In addition, when the cam cylinder 8 rotates, the shutter cam pin 7a, which is engaged with the shutter cam groove 8e on the inner peripheral side of the cam cylinder 8, is guided by the second bar 4b along the lift of the shutter cam groove 8e to move in the direction of the optical axis. Furthermore, when the roller guide 8i is rotated while being guided by the drum portions 9ib, the cam cylinder 8, wherein the cam cylinder drive cam groove 8g is engaged with the fixed cylinder ball follower 9b on the outer periphery of the fixed cylinder 9, moves in the direction of the optical axis along the lift of the cam cylinder drive cam groove 8g (refer to FIG. 7 and FIG. 15). The fourth lens L4 is extended and retracted in the direction of the optical axis by the fourth drive apparatus 15 to carry out the focusing operation.

Figure 12:
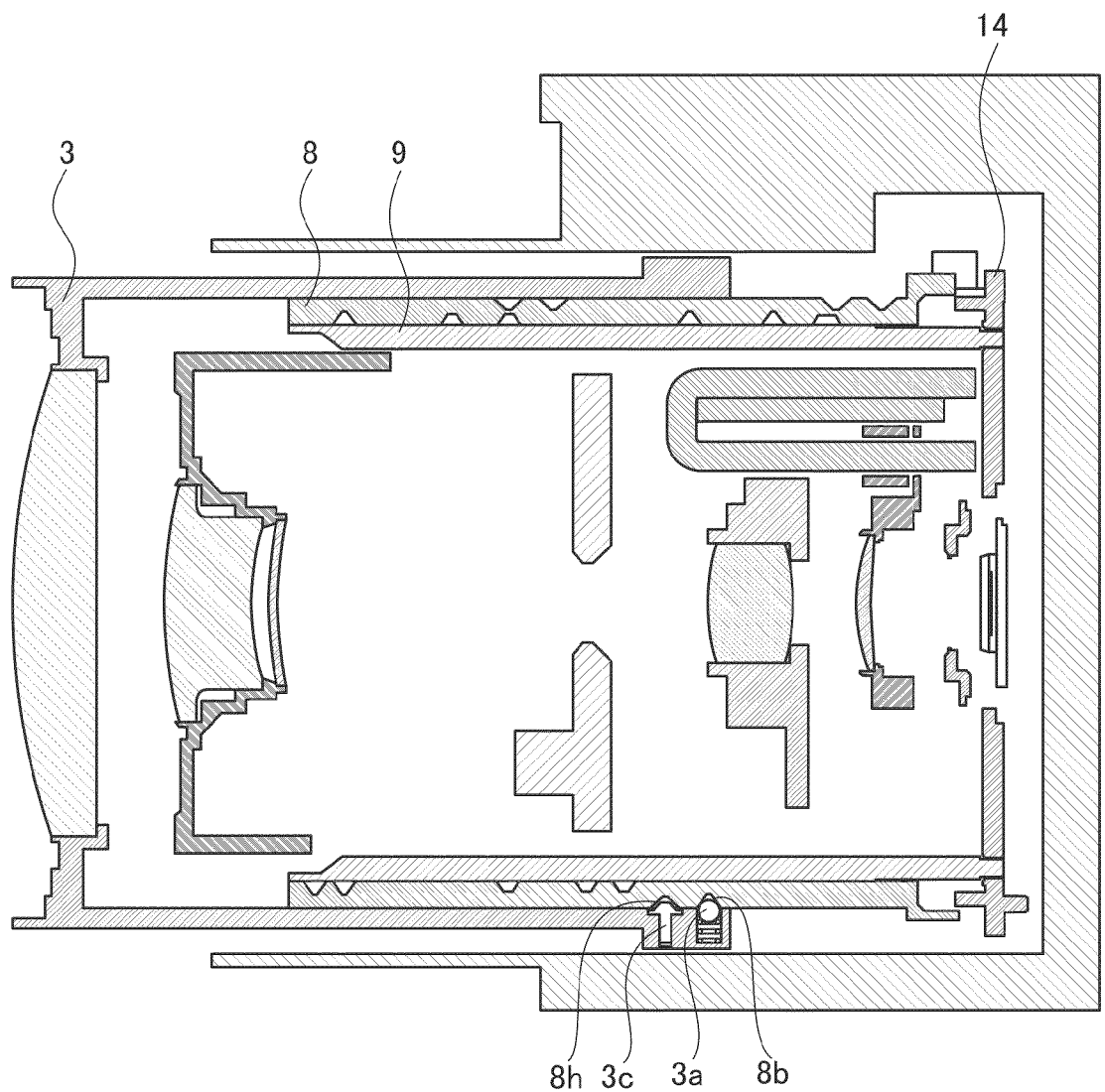
FIG. 12 is a cross-sectional drawing along line A-A in FIG. 3 in a wide-angle state.
Figure 13:
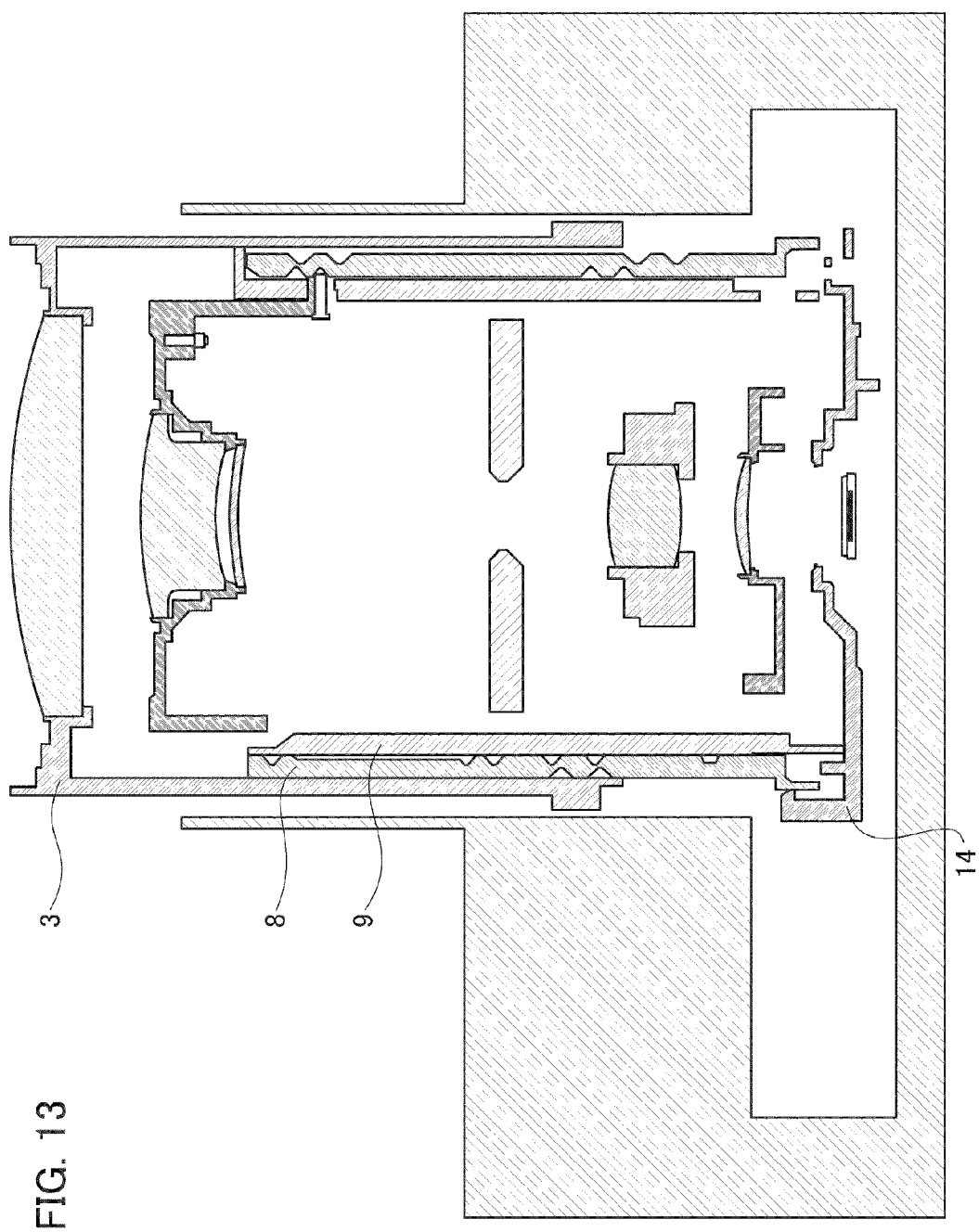
FIG. 13 is a cross-sectional drawing along line B-B in FIG. 3 in a wide-angle state.
Figure 14:
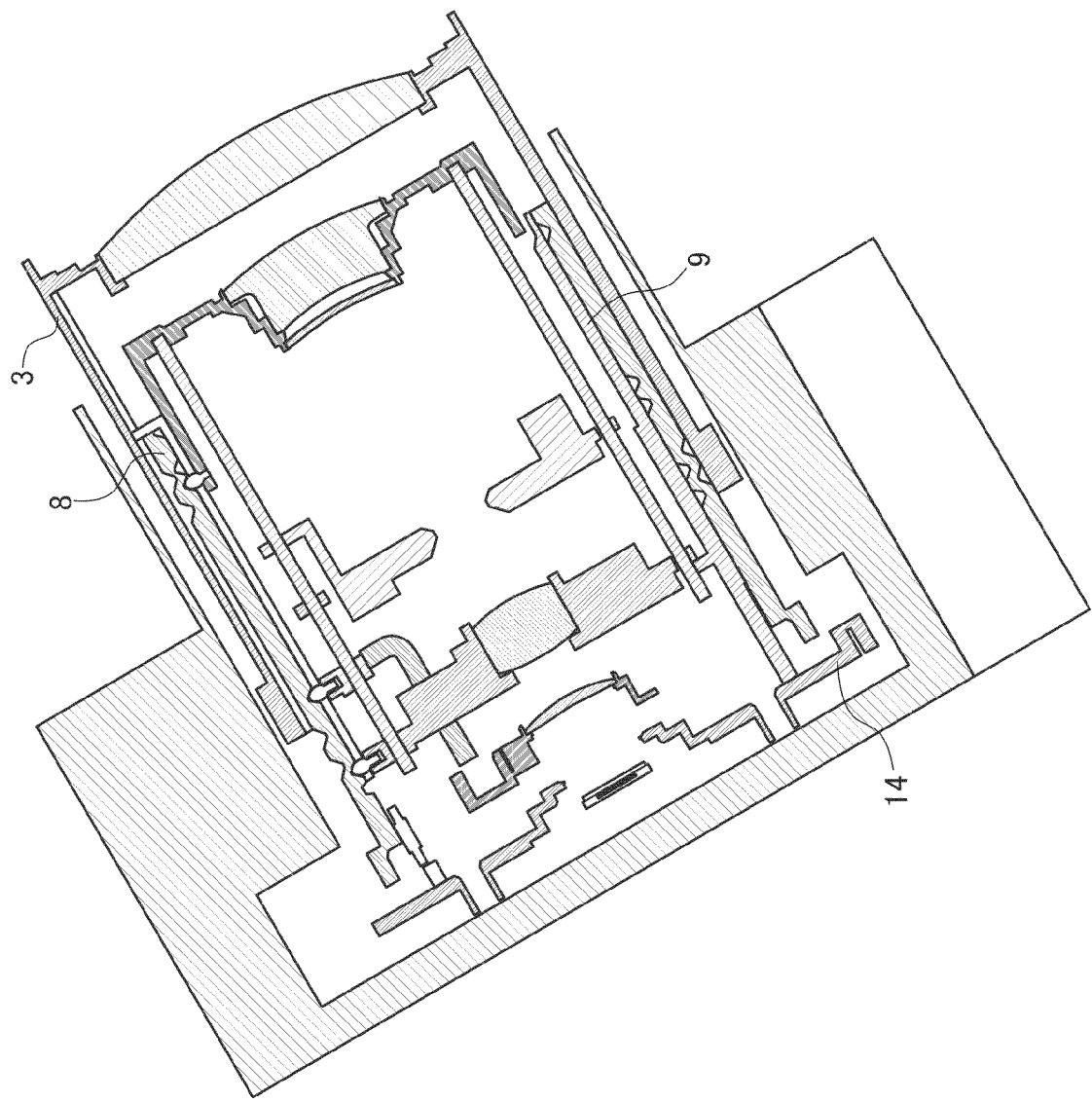
FIG. 14 is a cross-sectional drawing along line C-C in FIG. 3 in a wide-angle state.
Figure 15:
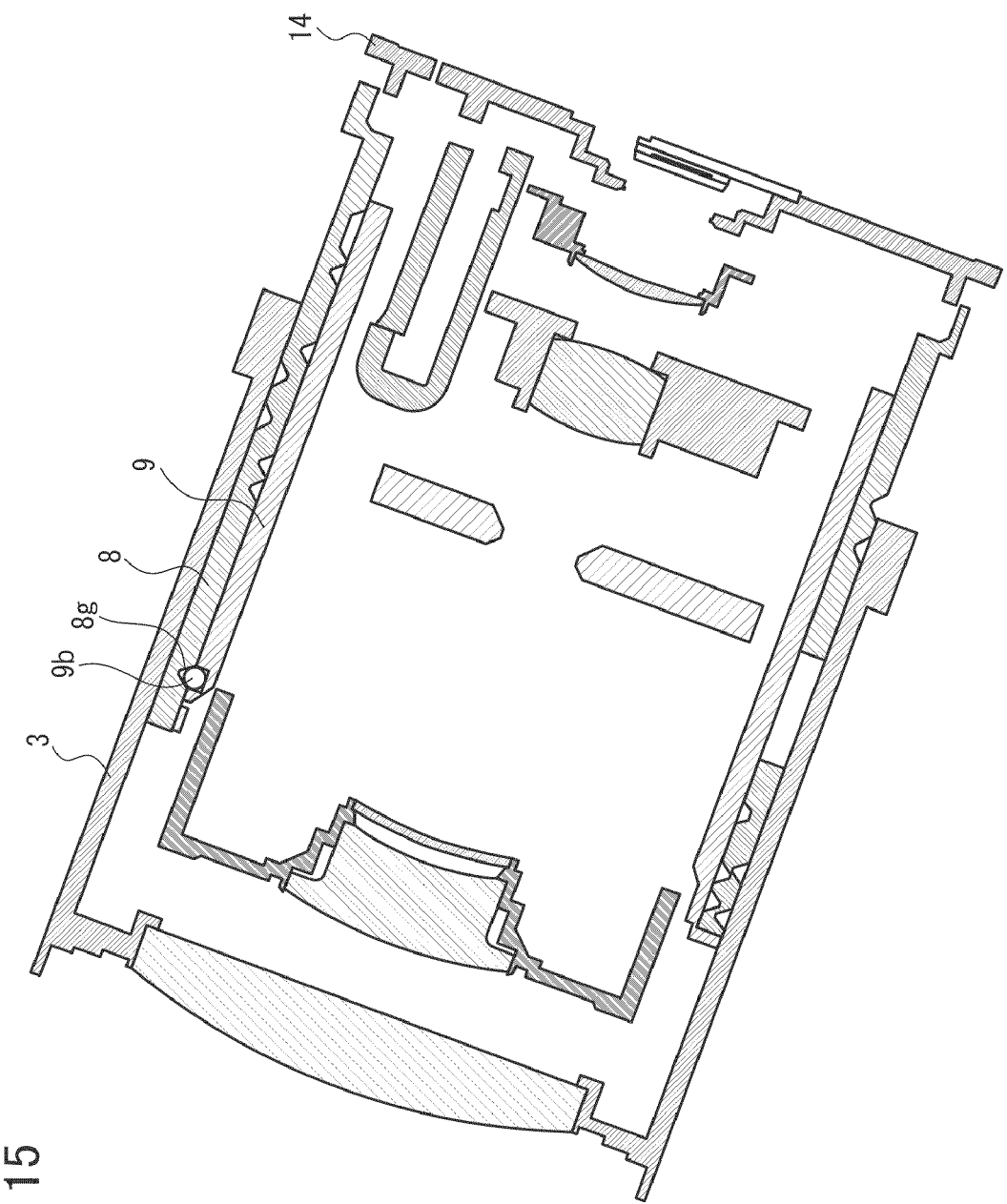
FIG. 15 is a cross-sectional drawing along line D-D in FIG. 3 in a wide-angle state.

FIG. 12 is a cross-sectional view along line A-A in FIG. 3 in a wide-angle state. FIG. 13 is a cross-sectional view along line B-B in FIG. 3 in the wide-angle state. FIG. 14 is a cross-sectional view along line C-C in FIG. 3 in a wide-angle state. FIG. 15 is a cross-sectional view along line D-D in FIG. 3 in a wide-angle state. The first lens holder, the second lens holder 4, the third lens holder 5, the fourth lens holder 6, the shutter unit 7, and the cam cylinder 8 move in the direction of the optical axis due to the rotation of the cam cylinder 8, and thus the lens barrel 2 moves from the retracted state shown in FIG. 4 to FIG. 6 to the wide photographing state shown in FIG. 12 to FIG. 15.

Figure 16:
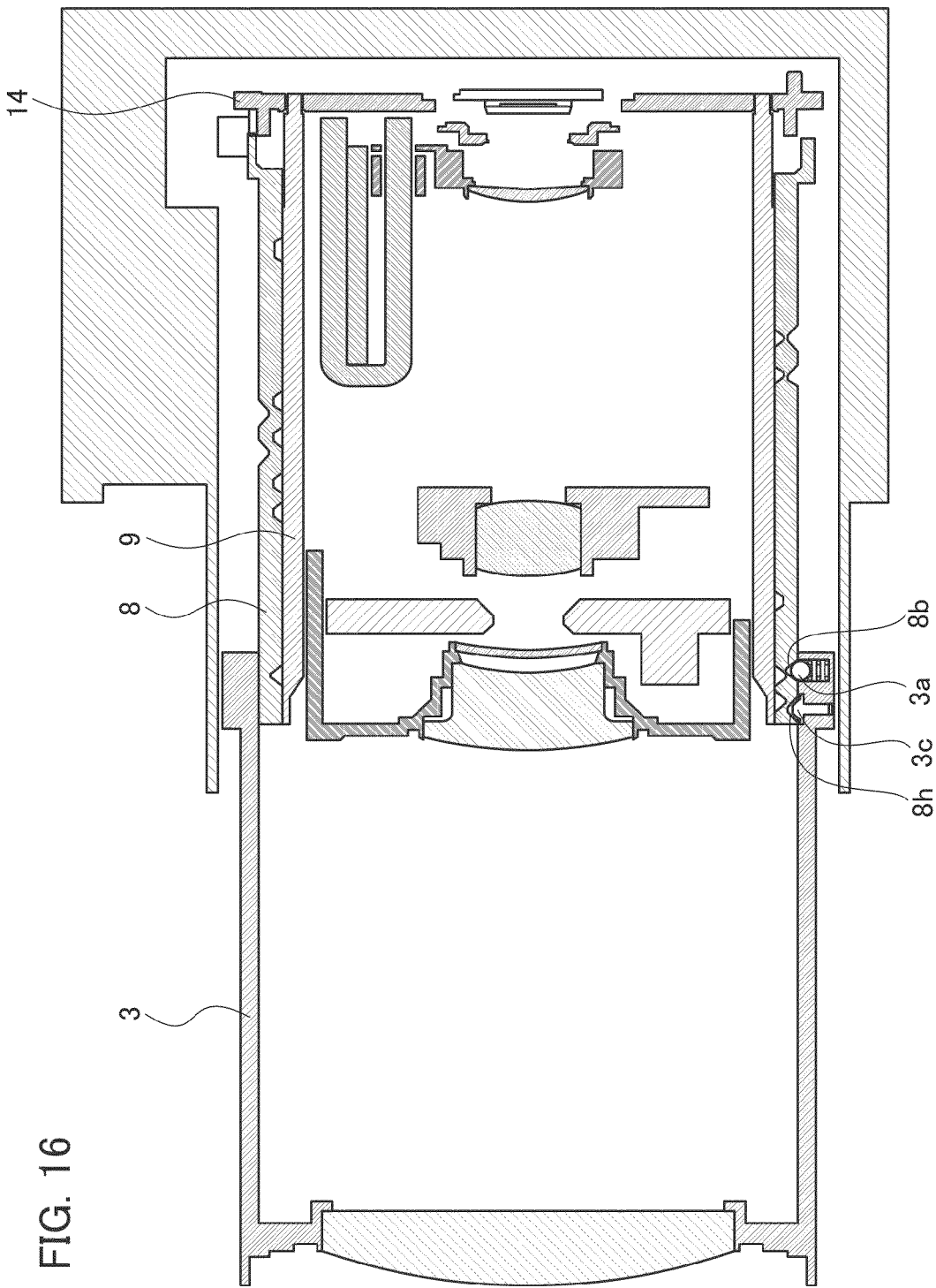
FIG. 16 is a cross-sectional drawing along line A-A in FIG. 3 in a telephoto state.
Figure 18:
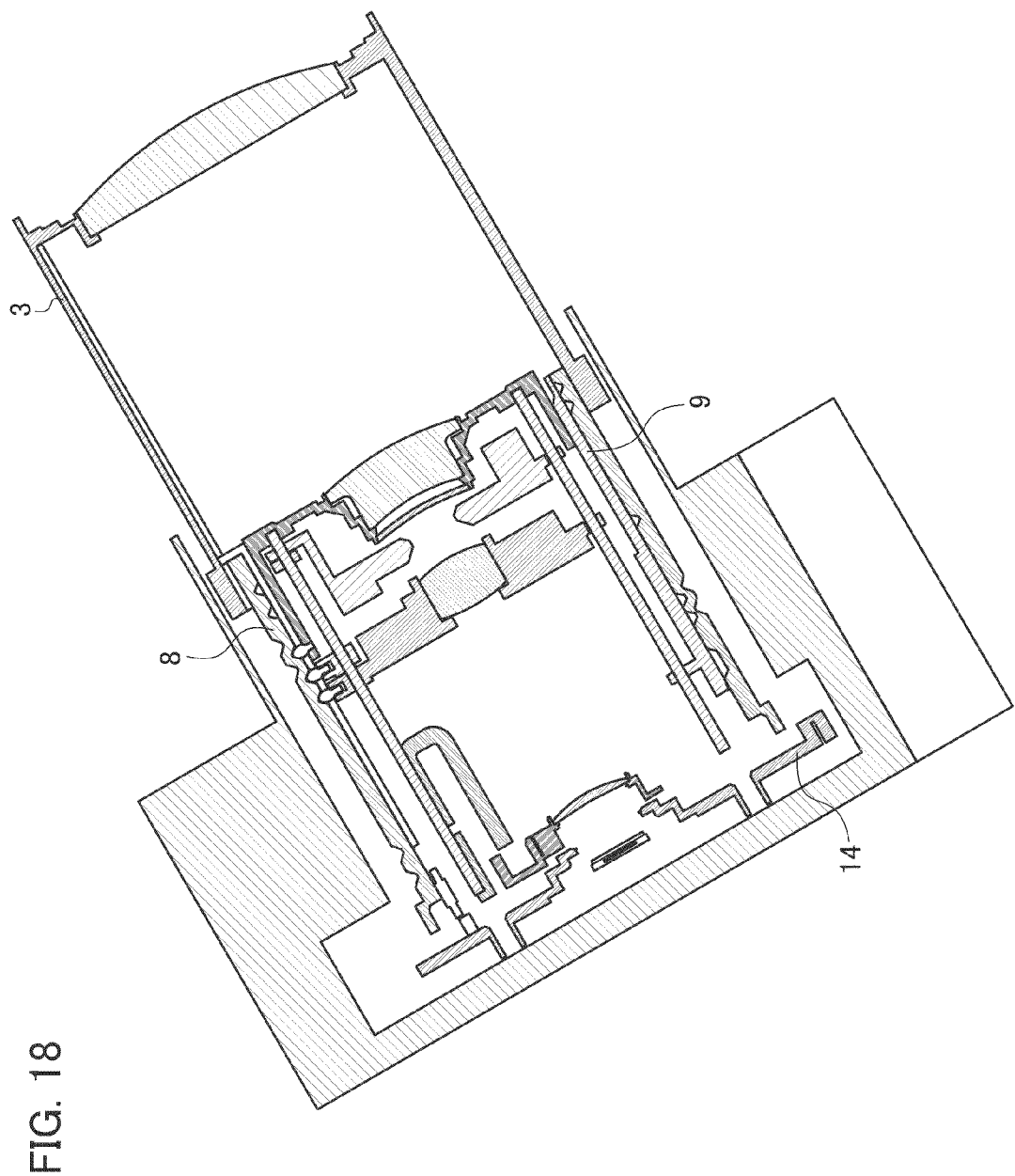
FIG. 18 is a cross-sectional drawing along line C-C in FIG. 3 in a telephoto state.

FIG. 16 is a cross-sectional view along line A-A in FIG. 3 in the telephoto state. FIG. 17 is a cross-sectional view along line B-B in FIG. 3 in a telephoto state. FIG. 18 is a cross-sectional view along line C-C in FIG. 3 in a telephoto state. Furthermore, from FIG. 16 to FIG. 18, the state moves to the telephoto photographing state due to the rotation of the cam cylinder 8.

Figure 19A:
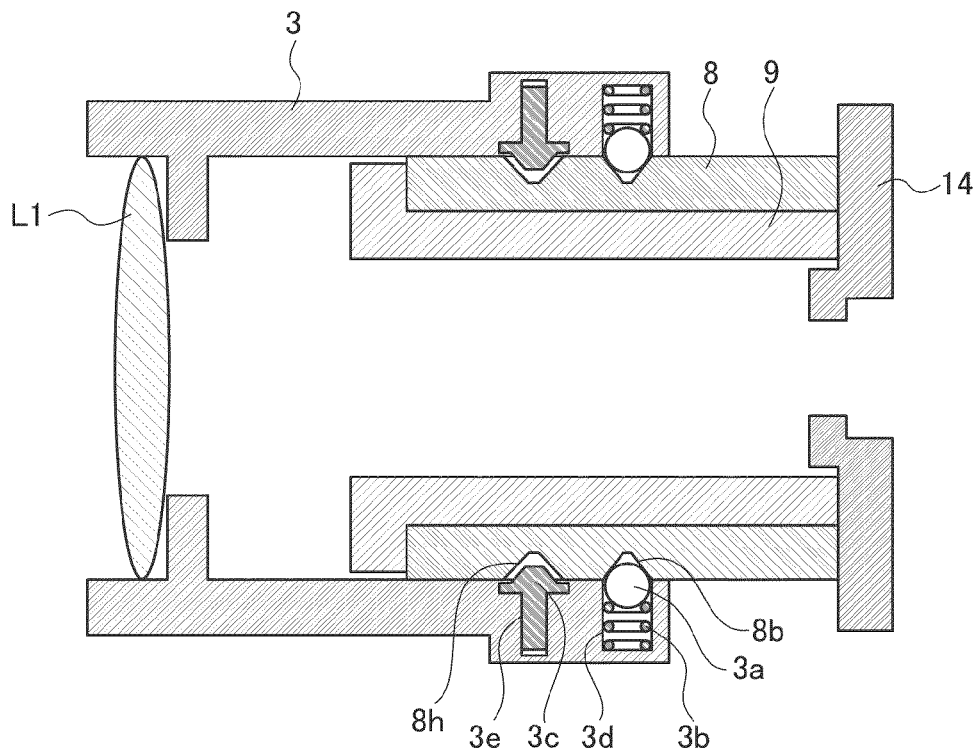
FIG. 19A and FIG. 19B are drawings that schematically show the first lens holder 3, the cam cylinder 8, the fixed cylinder 9, and the CCD holder 14.
Figure 19B:
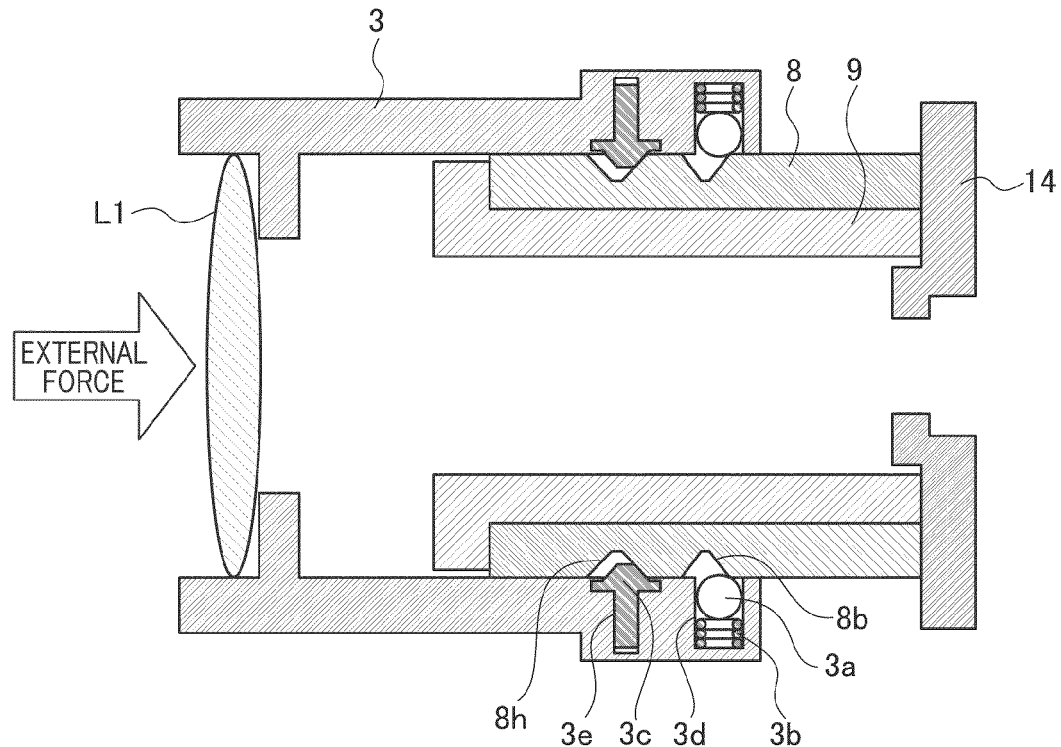

A case will be explained in which the camera using such a lens barrel is subject to an external force due, for example, to being dropped. FIG. 19A and FIG. 19B are drawings that schematically show the first lens holder 3, the cam cylinder 8, the fixed cylinder 9, and the CCD holder 14. FIG. 19A shows the state in which the first ball follower 3a is correctly engaged in the first cam groove 8b, and FIG. 9B shows the state in which a comparatively large external force has been applied to the first lens holder 3. When an external force is applied in a direction along the optical axis and this external force is strong enough to overcome the urging force of the first ball spring 3b at the first lens holder 3 and compress the first ball spring 3b, the first ball follower 3a becomes dislocated from the first cam groove 8b. In the present embodiment, the first ball follower 3a abuts the two inclined faces of the first cam groove 8b, and even when an external force is applied to the first lens holder 3 in a direction along the optical axis, an external force component in the direction along which the first ball spring 3b is compressed is generated by these inclined faces. Then, at least one side of the portion of the first ball follower 3a that abuts the two inclined faces of the first cam groove 8b no longer abuts them and becomes dislocated.

When the first ball follower 3a has been dislocated from the first cam groove 8b, the first external force receiving groove 8h and the first external force receiving pin 3c abut to receive the external force that is acting on the first lens holder 3. Thus, the first ball follower 3a strongly abuts the first cam groove 8b, and damage to or breakage of the first cam groove 8b can thereby be prevented. Alternatively, there may be a concern that the first external force receiving groove 8h will be damaged due to the abutting of the first external force receiving groove 8h and the first external receiving pin 3c. However, the first external force receiving groove 8h and the first external force receiving pin 3c do not abut in their normal drive state, and thus there will be no problems even if minor damage remains in the first external force receiving groove 8h.

In this manner, the first external force receiving pin 3c, which serves as a second auxiliary engaging portion, and the first external force receiving groove 8h, which serves as a first auxiliary engaging portion, do not abut when the first ball follower 3a, which serves as a second engaging portion, and the first cam groove 8b, which serves as a first engaging portion, are brought into engagement. In addition, the first external force receiving pin 3c, which serves as a second auxiliary engaging portion, and the first external force receiving groove 8h, which serves as a first auxiliary engaging portion, abut when the engagement between the first ball follower 3a, which serves as a second engaging portion, and the first cam groove 8b, which serves as a first engaging portion, has become at least partly dislocated.

In the explanation provided above, the first external force receiving pin 3c and the first external force receiving groove 8h act as auxiliary engaging portions that are brought into engagement when an external force acts. However, in the present embodiment, furthermore, the portions that are subject to an external force have also been explicated in relation to the cam cylinder 8, the fixed cylinder 9, and the CCD holder 14, and the load on the engaging portions is reduced. An external force that is transmitted to the first external force receiving groove 8h is transferred to the fixed cylinder ball follower 9b that has been brought into engagement with the cam cylinder drive cam groove 8g of the cam cylinder 8. In the case in which the force that is applied to the fixed cylinder ball follower 9b exceeds the urging force of the fixed cylinder ball spring portion 9d, the fixed cylinder ball follower 9b is dislocated from the cam cylinder drive cam groove 8g. When the fixed cylinder ball follower 9b becomes dislocated from the cam cylinder drive cam groove 9g, the cam cylinder external force receiving portion 8j abuts the CCD holder external force receiving portion 14a to receive the external force, and then the external force is transferred to the camera 1 via the CCD holder 14.

When the external force that has been applied to the first lens holder 3 is released, the fixed cylinder ball follower 9b is restored to the cam cylinder drive cam groove 8g due to the urging force of the fixed cylinder ball spring portion 9d, and similarly, the first ball follower 3a is restored to the first cam groove 8b due to the urging force of the first ball spring 3d.

In this manner, according to the present embodiment, because the external force receiving portions and the restoring unit that urges the balls toward the cam grooves are combined, the impact strength can be ensured by restoring a ball that has been dislocated due to the external force. In addition, the drive load on the lens barrel can be reduced in comparison to a lens barrel that uses a conventional cam pin because a ball is used in the follower of the portion to which an external force is applied. Furthermore, by using a ball in the follower, both noise reduction and high-speed zooming are made compatible, and the lens holding precision can be improved without play between the cam groove and the follower.

The embodiment that has been explained above is not intended to limiting, and various modifications and variations are possible that do not depart from the scope of the invention.

(1) In the present embodiment, an example in which a ball is used in the engaging portion was provided. However, this is not limiting, and, for example, a roller may be used in the engaging portions as a rotating body instead of a ball.

(2) In the present embodiment, a camera in which the lens barrel 2 was integrally provided in the camera body was explained as an example. However, this is not limiting, and, for example, the lens barrel may be an interchangeable lens barrel.

(3) In the present embodiment, a digital camera was explained as an example. However, this is not limiting, and any other type of photographic device, such as a film camera, a video camera, or a surveillance camera, may also be used.

Note that while the embodiments and the modifications can be used in appropriate combinations, the detailed explanation thereof has been omitted. In addition, the present invention is not limited by the embodiments that have been explained above. While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2008-200044 filed Aug. 1, 2008 which are hereby incorporated by reference herein it their entirety.

What is claimed is:

1. A lens barrel comprising:
a first cylinder member that has at least a portion formed in a cylindrical shape; and
a second cylinder member that has at least a portion formed in a cylindrical shape and that fits over the first cylinder member;
a first engaging portion is provided on the first cylinder member, the first engaging portion is provided on a side opposed to the second cylinder member; and
a second engaging portion is provided on the second cylinder member, the second engaging portion is formed in a spherical shape;
wherein the first cylinder member and the second cylinder member can rotate relatively around the center line of the cylindrical shapes due to the engagement of the first engaging portion and the second engaging portion, and
wherein the first cylinder member and the second cylinder member each have an auxiliary engaging portion that engages when an external force is acting in a direction along the center line of the cylindrical shapes.

2. A lens barrel according to claim 1,
wherein the auxiliary engaging portions comprise a first auxiliary portion that is provided on the first cylinder member and a second auxiliary engaging portion that is provided on the second cylinder member, and
wherein the first auxiliary engaging portion and the second auxiliary engaging portion do not abut when the first engaging portion and the second engaging portion are engaged, and abut when the engagement between the first engaging portion and the second engaging portion is at least partially dislocated.

3. The lens barrel according to claim 2,
wherein the first engaging portion has a cam shape whereby the second engaging portion serves as a follower, and
wherein either one of the first auxiliary portion and the second auxiliary portion are formed in a groove shape having a locus causing the parallel movement of the cam locus of the first engaging portion.

4. The lens barrel according to claim 1, further comprising a restoring unit that causes the state in which the engagement between the first engaging portion and the second engaging portion is at least partially dislocated to return to the engaged state.

5. The lens barrel according to claim 1, wherein the second engaging portion rolls while abutting the first engaging portion.

6. The lens barrel according to claim 1,
wherein the first engaging portion comprises inclined surfaces, and
wherein the second engaging portion abuts the inclined surfaces of the first engaging portion.

7. The lens barrel according to claim 1,
wherein the second cylinder portion defines a hole portion that opens in a direction perpendicular to the center line of the cylinder portion, and
wherein the second engaging portion fits into the hole portion and a possible movement of the second engaging portion is restricted to a direction perpendicular to the center line of the cylindrical shape.

8. The lens barrel according to claim 1, further comprising an urging unit that urges the second engaging portion toward the first engaging portion such that the first engaging portion and the second engaging portion abut.

9. The lens barrel according to claim 1, wherein the first engaging portion, the second engaging portion, and the auxiliary engaging portions are disposed at three equally spaced locations in a peripheral direction centered on the center line of the cylindrical shape.

10. An imaging apparatus comprising:
the lens barrel according to claim 1; and
an imaging portion that captures a subject image that is formed by the lens barrel.

* * * * *